Aug. 30, 1960     H. U. SCHUERCH     2,950,619
FLUTTER SIMULATOR

Filed Dec. 15, 1955     2 Sheets-Sheet 1

*INVENTOR.*
HANS U. SCHUERCH
BY Ralph B. Pastoriza

United States Patent Office 2,950,619
Patented Aug. 30, 1960

2,950,619

FLUTTER SIMULATOR

Hans U. Schuerch, Pacific Palisades, Calif., assignor, by mesne assignments, to the United States of America as represented by the Secretary of the Army Filed Dec. 15, 1955, Ser. No. 553,239

1 Claim. (Cl. 73—67.2)

This invention relates generally to simulating apparatus and more particularly to a system for simulating flutter conditions in airfoils. For purposes of the present specification and claim, the word "airfoil" 'is defined as any aerodynamic structure designed to obtain reaction upon its surfaces from the air through which it moves.

The conventional type of fluttering of airfoils primarily consists of a combination of two basic motions. The first of these motions is in the form of a translational displacement of the end portion of the airfoil with respect to its root. The second type of motion comprises an angular displacement or twisting of the airfoil about the longitudinal axis or axis perpendicular to the cord of the airfoil. The two motions interact when aerodynamic forces are present, in that the latter twisting or angular type motion will alter the attitude of the airfoil, thereby giving rise to changing lift forces which in turn tend to augment or diminish the bending or translational motion of the airfoil. An aerodynamically stable airfoil design, insofar as flutter conditions are concerned, is one so constructed that any combination of these motions are relatively quickly damped.

In order to arrive at an aerodynamically stable structure, it is first necessary to know the aerodynamic forces to which a proposed prototype airfoil may be subject under given flight conditions, such as altitude and speed. These forces may be mathematically derived from aerodynamic theory by conventional methods. Alternatively, the aerodynamic forces may be determined by wind tunnel or actual flight tests.

After such aerodynamic forces have been determined for a given altitude and speed, the manner in which these forces act on the prototype airfoil and the manner in which they vary as a result of the reaction of the airfoil itself to such forces, must be determined. For example, if the forces are such as to change the attitude of the airfoil, a redistribution of the effects of the forces on the airfoil is established for the new position of the airfoil. Such variation in force effects may be such as to establish resonant conditions in the airfoil structure resulting in uncontrolled flutter. Alternatively, the new effects of the aerodynamic forces may be such as to damp out any tendency toward a flutter condition in which case the airfoil may be said to be stable.

One method of analysis to determine flutter stability, without the necessity of actual wind tunnel or flight testing, consists of drawing up a mechanical system of ideal springs, point masses, and rigid linking members representing a proposed aerodynamic airfoil structure. Many simplified assumptions must necessarily be made in order to provide a mechanical equivalent that can be practically represented by a workable number of mathematical equations.

From this idealized mechanical system, an electrical network is built up of passive elements which exactly represents the mechanical system. Displacements and velocities associated with points of the mechanical structure may be represented by voltages and currents. The theoretically computed aerodynamic forces under certain flight conditions of the airfoil are converted into suitable voltages or currents and applied to the electrical network at locations corresponding to the locations on the actual prototype airfoil where such forces would act. Measurements of the resulting voltages and currents at different locations in the network are then taken and serve to indicate the displacements and velocities taking place at these different locations, which, in turn, will indicate the stability of the structure. The electrical network serves essentially as an analog computer in that it removes the necessity of solving large numbers of simultaneous differential equations to arrive at a solution of the stability problem.

The principal weakness in the above approach resides in the simplifying assumptions that are necessarily made in building up the idealized mechanical system and subsequently, the analogous electrical system from the actual airfoil surface prototype design under consideration. The ultimate stability characteristics of the airfoil as determined in accordance with the method, are, therefore, no more valid or accurate than are these simplifying assumptions.

The primary object of the present invention is to provide an aerodynamic flutter simulator in which it is not necessary to make any of the above-mentioned simplifying assumptions in conducting a flutter stability analysis.

More particularly, an object of the invention is to provide a flutter simulator system in which the proposed prototype design itself is used in conjunction with an electrical network energized in accordance with the theoretically computed aerodynamic forces, whereby a more accurate analysis can be made and wherein such analysis is limited only by the accuracy with which the aerodynamic forces can be theoretically computed.

Other more general objects of the invention are to provide an analysis apparatus for testing airfoils which generates aerodynamic forces at certain locations of the airfoil in a manner heretofore equivalently achieved by wind tunnel and flight testing, whereby the necessity of such wind tunnel and flight testing is obviated.

Briefly, these and other objects and advantages of the present invention are attained by providing transducer means responsive to movement of an airfoil for providing input signals that are functions of the physical motions of the airfoil. These input signals are fed to an electrical aerodynamic computing network wherein they are modified with signals generated in accordance with computed aerodynamic characteristics of the airfoil under given flight conditions, to provide output signals. These output signals are in turn fed into a force generating means responsive to the output signals and adapted to be applied to the airfoil to establish forces in the airfoil substantially corresponding to the aerodynamic forces to which the airfoil would be subject under wind tunnel or flight conditions.

A better understanding of the invention will be had by referring to the accompanying drawings in which.

Figure 1:
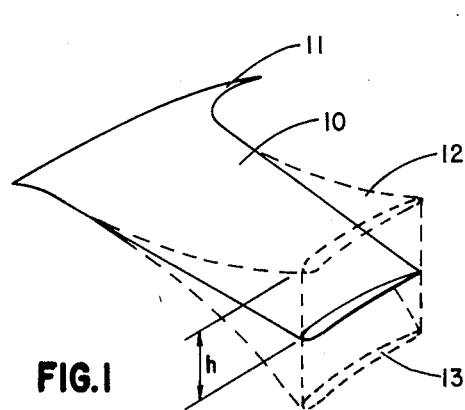
Figure 1 is a schematic perspective view of an airfoil illustrating a first basic component of flutter motion.

Referring to Figure 1, there is shown an airfoil 10 having a root portion 11 secured to a fuselage (not shown). One basic component of flutter motion is illustrated as a vertical translational displacement of the end portion of the airfoil with respect to the root 11. The amplitude of this vertical displacement is indicated by the letter $h$, the airfoil 10 oscillating between the positions 12 and 13 as indicated in dotted lines. Effective damping of this bending motion is realized by proper structural design of the airfoil 10 itself, and its securement at the root portion 11 to the aircraft fuselage. Among the several design characteristics are the distribution of mass in the airfoil, inherent elasticity and damping of the structural members, and the geometrical configuration of the structure.

Figure 2:
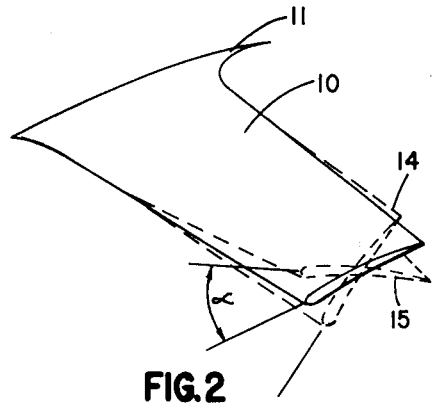
Figure 2 is a view similar to Figure 1, illustrating a second basic component of flutter motion.

Referring now to Figure 2, a second basic component of flutter motion is illustrated as a twist about the longitudinal axis of the airfoil 10. The amplitude of this angular motion is indicated by the angle $\alpha$, the angular twisting taking place between the positions 14 and 15 as indicated by the dotted lines. Effective damping of this twisting type of motion is achieved, as in the case of the translational motion, by proper structural design of the airfoil and its attachment to the aircraft fuselage.

Fluttering usually consists of a combination of these two basic motions and, as mentioned previously, each motion will have an effect on the other when the airfoil is subject to conventional aerodynamic forces.

The combination of the two basic fluttering motions can be described by determining the displacements of two points spaced apart along a cross section of an airfoil. For example, in Figure 3 there is shown the cross section of an airfoil 16 and two points or locations A and B on the airfoil intersected respectively by the dashed vertical lines labeled A' and B' and separated by a distance $a$.

The linear displacement designated $h$, or $h_2$ respectively of the points of the airfoil at either A or B determines the first type of flutter motion illustrated in Figure 1 whereas the difference between the displacements $h_1$ and $h_2$ divided by the separation distance $a$, will give an indication of the angle $\alpha$, that is, the type of flutter motion illustrated in Figure 2. Therefore, by providing signals that are functions of $h_1$ and $h_2$ the combined flutter motions may be represented by a suitable combination of these signals.

Figure 3:
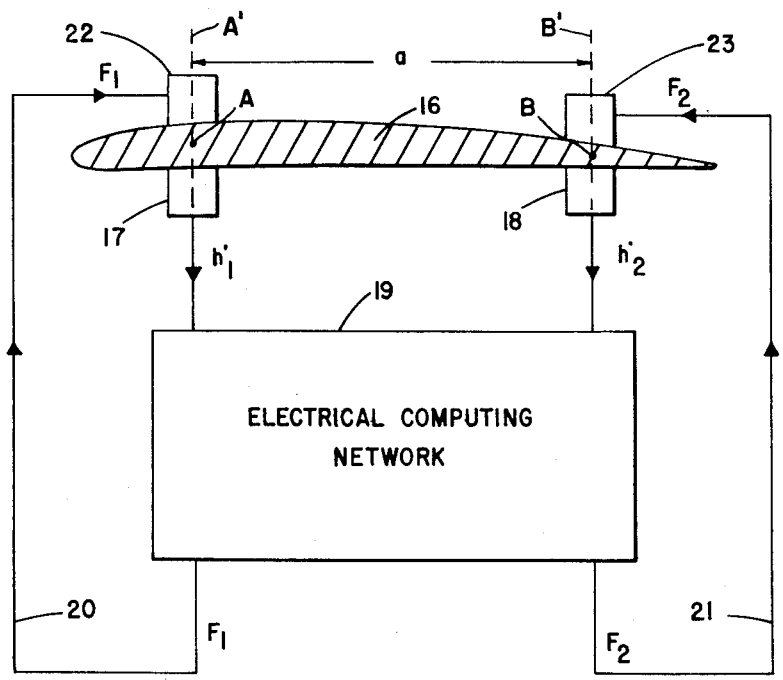
Figure 3 is a schematic diagram useful in describing and explaining the flutter simulating apparatus of this invention; and, Figure 4 is a schematic block diagram of one example of the computing network shown in Figure 3.

In Figure 3 there is schematically illustrated a means for applying forces corresponding to aerodynamic forces to which an airfoil 16 would be subject under given flight conditions in order to determine the effectiveness of the airfoil structural design in damping out the above-referred to basic types of flutter motions. As shown, the apparatus comprises a transducing means including a pair of velocity pickups 17 and 18 secured at the spaced locations A and B on a cross section of the airfoil 16. The separation distance of these points is indicated as "$a$." From the velocity pickups 17 and 18, electrical signals are provided which are proportional to the rate of change of position of the points respectively with respect to time. These rates of change are indicated as $\dot{h}_1$ and $\dot{h}_2$ respectively, where $h_1$ designates the physical translational displacement of the point A on the airfoil 16 to which the velocity pickup 17 is attached, and $h_2$ designates the physical translational displacement of the point B on the airfoil 16 to which the velocity pickup 18 is attached.

The signals corresponding to $\dot{h}_1$ and $\dot{h}_2$ are fed into an electrical computing network represented by the box 19 in Figure 3. This network includes both passive and active electrical components capable of modifying input signals from the velocity pickups 17 and 18 in accordance with the theoretically computed aerodynamic characteristics of the airfoil under given flight conditions, such as altitude and speed.

The resulting output signals are designated $F_1$ and $F_2$. These output signals are passed through leads 20 and 21 to force generating means in the form of electrical transducers 22 and 23 connected to the airfoil at points corresponding to those at which the velocity pickups 17 and 18 are attached. The transducers 22 and 23 may simply comprise electromagnetic shakers wherein an electromagnetic coil is excited with the output signals to move a plunger rigidly secured to the airfoil. These force generators are arranged to establish forces and force moments in the airfoil structure which correspond to those aerodynamic forces to which such a design would be subject under the given flight conditions of altitude and speed. Generally, the output signals are in the form of electrical currents whose magnitudes are functions of the forces and moments established in the structure. Thus $F_1$ and $F_2$ may be functionally represented as follows:

$$F_1 = f(h_1, \dot{h}_1, h_2, \dot{h}_2, a, \text{speed, altitude})$$
$$F_2 = g(h_1, \dot{h}_1, h_2, \dot{h}_2, a, \text{speed, altitude})$$

where $f$ and $g$ represent different functions of the various parameters indicated in the parentheses. The functions $f$ and $g$ are well known equations and are computed from known aerodynamic formulae. The unknowns in these equations comprise the variable parameters, $h_1$, $h_2$, $\dot{h}_1$, and $\dot{h}_2$. The separation distance "$a$" is known and the speed and altitude are chosen in accordance with the contemplated speed and altitude of the aircraft employing the airfoil under investigation.

By employing transducers secured directly to the airfoil itself, the unknown variable parameters $h_1$, $h_2$, $\dot{h}_1$, and $\dot{h}_2$ are automatically and continuously supplied to the computing network 19. The functions $F_1$ and $F_2$ are thus determined and applied to the airfoil as described.

In operation, an initial external transient force is applied to the airfoil 16 resulting in displacements of the spaced points $h_1$ and $h_2$ of the airfoil. The actual displacement, as well as the rate of change of the displacement, is determined by the physical design characteristics of the airfoil. Therefore, the signals fed to the electrical computing network 19 constitute a precise function of these parameters. Suitable transforming and integrating circuits in the network provide electrical signals representing the aerodynamic forces determined by the functions $f$ and $g$ which will act upon the airfoil. These electrical signals will actuate the force generating means or shakers to actually exert these forces upon the airfoil.

By feeding back force signals into the airfoil to establish forces and moments in the airfoil which in turn result in displacement changes in $h_1$ and $h_2$, any flutter instability will result in a building up of the flutter motions until certain components in the circuit 19 such as amplifiers become saturated thereby indicating instability without danger of actual damage to the airfoil. On the other hand, if the forces and moments established in the airfoil are such that the flutter motions tend to damp out, it will be evident that the design is of an aerodynamically stable configuration.

Figure 4:
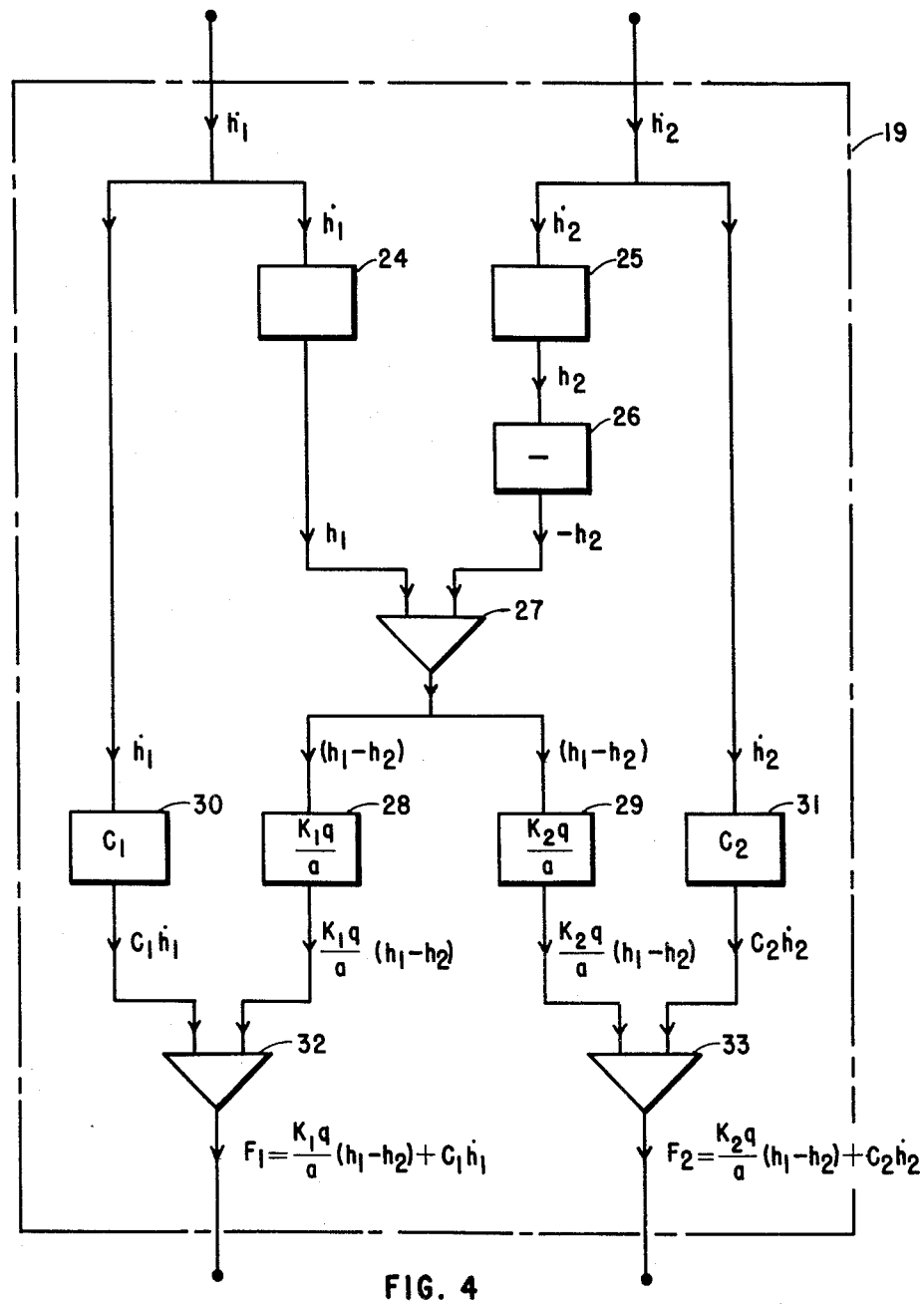

As a specific example of the foregoing principles, reference is had to Figure 4 which illustrates a simplified computing network which might be employed in the block 19 of Figure 3.

In Figure 4, it is assumed that the desired aerodynamic equations defining the force functions $F_1$ and $F_2$ are of the following form:

$$F_1 = \frac{K_{1q}}{a}(h_1 - h_2) + C_1 \dot{h}_1$$

$$F_2 = \frac{K_{2q}}{a}(h_1 - h_2) + C_2 \dot{h}_2$$

where $K_1$, $K_2$, $C_1$, and $C_2$ are numerical constants, $q$ represents dynamic pressure which in turn is a function of altitude and speed, and $a$, as before, is the separation distance of the points A and B of Figure 3. The quantity $(h_1 - h_2)/a$ represents the angle $\alpha$ and thus the first term of each equation reflects the resulting aerodynamic forces as a consequence of change in altitude of the airfoil.

The terms $C_1\dot{h}_1$ and $C_2\dot{h}_2$, on the other hand, represents the forces as a result of the linear velocity of the points A and B in a direction normal to the chord of the airfoil.

The simplified circuit of Figure 4 accordingly is designed to generate force functions $F_1$ and $F_2$ corresponding to the foregoing equations. To this end, the velocity signals $\dot{h}_1$ and $\dot{h}_2$ are first fed through integrating circuits represented by the blocks 24 and 25. The resulting signals then indicate the displacements $h_1$ and $h_2$. The displacement signal $h_2$ is passed through an inverting circuit, for example, a unity gain amplifier to provide the signal $-h_2$. The signals $h_1$ and $-h_2$ are then added together in a summing amplifier 27 to provide the quantity $(h_1-h_2)$.

From the summing amplifier 27 the signal $(h_1-h_2)$ is fed through modifying means in the form of passive networks 28 and 29. Network 28 may include, for example, attenuating variable resistances adjusted in accordance with the coefficient $$\frac{K_{1q}}{a}$$

that is, in accordance with the contemplated altitude and speed for which the airfoil is being tested. The resulting signal is simply $$\frac{K_{1q}}{a}(h_1-h_2)$$

Similarly the network 29 may include attenuating resistances adjusted to modify the input signal to provide the output signal $$\frac{K_{2q}}{a}(h_1-h_2)$$

Simultaneously with the foregoing operations the initial velocity signals $\dot{h}_1$ and $\dot{h}_2$ are also fed directly from the transducer pick ups to modifying means in the form of networks 30 and 31 which include attenuating resistances adjusted to provide the signals $C_1\dot{h}_1$ and $C_2\dot{h}_2$ respectively.

As shown in Figure 4 the signals $$\frac{K_{1q}}{a}(h_1-h_2)$$

and $C_1\dot{h}_1$ are then added in a summing amplifier 32 to provide the desired force signal $$F_1=\frac{K_{1q}}{a}(h_1-h_2)+C_1\dot{h}_1$$

Similarly the signals $$\frac{K_{2q}}{a}(h_1-h_2)$$

and $-C_2\dot{h}_2$ are added in a summing amplifier 33 to provide the desired force signal $$F_2=\frac{K_{2q}}{a}(h_1-h_2)+C_2\dot{h}_2$$

The two signals are then fed back to operate the shakers 22 and 23 as described in connection with Figure 3.

It will be evident that by adjusting the attenuating characteristics of the various control networks 28, 29, 30, and 31 of Figure 4 while the airfoil is under test, difference dynamic forces $q$ as occur at different speeds and altitudes can be inserted in the force signals $F_1$ and $F_2$ and the airfoil observed as to its flutter characteristics under these varying conditions. If power amplifiers of sufficient gain are employed for example, the generated force signals could be made large enough to break the airfoil. Since the magnitude of this signal in turn will depend upon the coefficients $$\frac{K_{1q}}{a} \text{ and } \frac{K_{2q}}{a}$$

the dynamic force $q$, and thus the altitude and speed can be found at which rupture will occur. As mentioned heretofore, the amplifiers are designed to saturate prior to rupture of the airfoil to avoid damage thereto. However, it will be readily apparent that the conditions resulting in instability can be readily indicated by the settings of the networks 28, 29, 30 and 31 at which instability or saturation conditions are observed.

It will be seen, accordingly, that the present invention provides a system for testing the stability of an airfoil in which no assumptions need be made in the establishing of electrical signals as functions of the structural design of the airfoil, inasmuch as such signals are generated directly from motion of the airfoil. Further, costly and time consuming experiments in wind tunnels and in actual flight testing are avoided.

While the invention has been described in connection with two dimensional flutter motions, it is to be understood that addition of further velocity pickups and force generating units would enable motions of three or more degrees of freedom to be analyzed. The invention, therefore, is not to be thought of as limited to the specific embodiment chosen for illustrative purposes.

What is claimed is:

In an apparatus for simulating flutter conditions in an airfoil, including an electrical network capable of providing electrical output signals representing the solutions of aerodynamic equations defining forces to which said airfoil is subjected at a given altitude and speed, said solutions being functions of the displacements and velocities of points on said airfoil, the combination comprising: means for providing voltages and currents for said electrical network varying with said displacements and velocities, including two electro-mechanical transducing elements secured to said airfoil at spaced points whereby translational displacement of the end of the airfoil with respect to its root and the angular displacement about the longitudinal axis of the airfoil are translated into said voltages and currents; and force generating means secured to said airfoil at said spaced points and electrically connected to said electrical network for receiving said electrical output signals representing the solutions of said aerodynamic equations whereby said airfoil is subjected to the aerodynamic forces to which it would be subjected at said given altitude and speed.

References Cited in the file of this patent

UNITED STATES PATENTS

| | | |
|---|---|---|
| 2,305,268 | Minor et al. | Dec. 15, 1942 |
| 2,361,071 | Vang | Oct. 24, 1944 |
| 2,362,467 | Clark | Nov. 14, 1944 |
| 2,448,698 | Biot et al. | Sept. 7, 1948 |